US 9,183,106 B2

(12) United States Patent
Rao et al.

(10) Patent No.: US 9,183,106 B2
(45) Date of Patent: Nov. 10, 2015

(54) SYSTEM AND METHOD FOR THE AUTOMATED GENERATION OF EVENTS WITHIN A SERVER ENVIRONMENT

(75) Inventors: Anil V. Rao, Austin, TX (US); Chandrasekhar Mugunda, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1522 days.

(21) Appl. No.: 11/332,558

(22) Filed: Jan. 13, 2006

(65) Prior Publication Data
US 2007/0168049 A1 Jul. 19, 2007

(51) Int. Cl.
G06F 11/07 (2006.01)
G06F 11/30 (2006.01)

(52) U.S. Cl.
CPC ........ *G06F 11/3031* (2013.01); *G06F 11/3055* (2013.01); *G06F 11/3058* (2013.01); *G06F 11/0766* (2013.01)

(58) Field of Classification Search
USPC .................... 700/11, 17, 79, 80, 83; 340/506; 702/187, 188; 709/224; 714/39, 48
See application file for complete search history.

(56) References Cited

U.S. PATENT DOCUMENTS

| | | | | |
|---|---|---|---|---|
| 4,336,853 A * | 6/1982 | Hirano | | 177/25.18 |
| 5,764,657 A * | 6/1998 | Jones | | 714/738 |
| 6,496,790 B1 * | 12/2002 | Kathavate et al. | | 702/188 |
| 6,772,099 B2 * | 8/2004 | Merkin et al. | | 702/188 |
| 6,904,391 B2 | 6/2005 | Merkin et al. | | |
| 6,948,008 B2 * | 9/2005 | Hawkins et al. | | 710/15 |
| 6,954,466 B1 * | 10/2005 | Dalleggio et al. | | 370/463 |
| 7,051,363 B2 * | 5/2006 | Cheng et al. | | 726/2 |
| 7,069,349 B2 * | 6/2006 | Hawkins et al. | | 710/15 |
| 7,188,171 B2 * | 3/2007 | Srinivasan et al. | | 709/224 |
| 7,194,456 B2 * | 3/2007 | Longshaw | | 707/3 |
| 7,237,086 B1 * | 6/2007 | Kothandapani et al. | | 712/8 |
| 7,340,379 B2 * | 3/2008 | Kunkel et al. | | 702/188 |
| 7,345,580 B2 * | 3/2008 | Akamatsu et al. | | 340/506 |
| 7,589,624 B2 * | 9/2009 | Hatakeyama | | 340/505 |
| 7,707,282 B1 * | 4/2010 | Kothandapani | | 709/224 |
| 2002/0055790 A1 * | 5/2002 | Havekost | | 700/80 |
| 2004/0249913 A1 | 12/2004 | Kaufman, Jr. | | |
| 2005/0137833 A1 * | 6/2005 | Sistla | | 702/188 |
| 2006/0085690 A1 | 4/2006 | Bolen et al. | | |
| 2006/0158325 A1 * | 7/2006 | Cha et al. | | 340/521 |
| 2007/0088816 A1 * | 4/2007 | Hrustemovic et al. | | 709/224 |

(Continued)

OTHER PUBLICATIONS http://www.intel.com/design/servers/ipmi/pdf/IPMIv2_0_rev1_0_E3_markup.pdf.*

(Continued)

*Primary Examiner* — Robert Fennema
*Assistant Examiner* — Jennifer L Norton
(74) *Attorney, Agent, or Firm* — Baker Botts L.L.P.

(57) ABSTRACT

A system and method is disclosed in which the buses and physical characteristics of a server computer are monitored through server management software. A data structure for a monitored characteristic or group of characteristics is created and stored in a repository of data structures for other monitored devices and attributes within the server computer. As events, such as failure and pre-failure events, occur on one or more of the monitored attributes, the event is recorded in an event log. Using the server management software, monitoring commands can be issued by the baseboard management controller to each monitored bus to check the status of the attribute or device.

16 Claims, 3 Drawing Sheets

(56) References Cited

U.S. PATENT DOCUMENTS

| | | | |
|---|---|---|---|
| 2009/0089624 A1* | 4/2009 | Austen et al. | 714/39 |
| 2009/0254769 A1* | 10/2009 | Brundridge et al. | 713/320 |
| 2010/0010944 A1* | 1/2010 | Cheng et al. | 706/12 |
| 2010/0014514 A1* | 1/2010 | Slevert | 370/389 |
| 2010/0017873 A1* | 1/2010 | Sievert | 726/17 |
| 2010/0023598 A9* | 1/2010 | Ginter et al. | 709/217 |
| 2011/0050410 A1* | 3/2011 | Rezvani et al. | 340/506 |
| 2011/0119424 A1* | 5/2011 | Chen et al. | 710/305 |
| 2011/0153276 A1* | 6/2011 | Lee et al. | 702/188 |

OTHER PUBLICATIONS

Zhou et al., Remote Management with the Baseboard Management Controller in Eighth Generation Dell PowerEdge Servers, Dell Power Solutions Magaine, Oct. 2004, 26-29, available at http://www.dell.com/downloads/global/power/ps4q04-20040110-Zhuo.pdf.

* cited by examiner

SYSTEM AND METHOD FOR THE AUTOMATED GENERATION OF EVENTS WITHIN A SERVER ENVIRONMENT

TECHNICAL FIELD

The present disclosure relates generally to computer systems and information handling systems, and, more particularly, to a system and method for generating events within a server environment.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computer system, such as a server computer, may include management software for monitoring the status of the computer. One example of server management software is Intelligent Platform Management Interface (IPMI) software. The IPMI protocol defines a set of established interfaces for the monitoring and reporting the status of components of a server computer. IPMI software is server management software that executes on the baseboard management controller of the server computer. IPMI software employs the intelligence of the various hardware devices to present a common, standardized interface for monitoring and reporting on the status of the hardware devices within the server system. An IPMI-compliant computer system will typically include a system event log. Deviations from normal operation within the computer system are recorded in the system event log. Each event is associated with a sensor, and each sensor is associated with a sensor data record, which is a data record that describes the system event or deviation from normal operation. During the operation of a system, the system event log may receive sensor data records that are unfamiliar to the system administrators who operate the system event log. In this circumstance, the system administrator may not be able to properly or efficiently respond to the event that caused the sensor data record to be entered in the system event log.

SUMMARY

In accordance with the present disclosure, a system and method is disclosed for generating a list of each possible event record that could be recorded to the system event log of an IPMI-compliant computer system. For each sensor data record, the static portions of an event record are completed. The event record is then duplicated and a trigger event is noted as having occurred in one of the copies of the event record. For each copy, event-specific information is written to the event records.

The system and method disclosed herein is technically advantageous because, once all of the generated event records are known, the set of possible event records can be analyzed. Having knowledge of each possible event record is valuable, as it provides a user or administrator with the opportunity to plan for and manage each possible event in the computer. In addition, because each possible event is known, a set of translations could be constructed in which an IPMI event is translated (by humans or a computer) for use and handling by another human, operating system, or computer system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
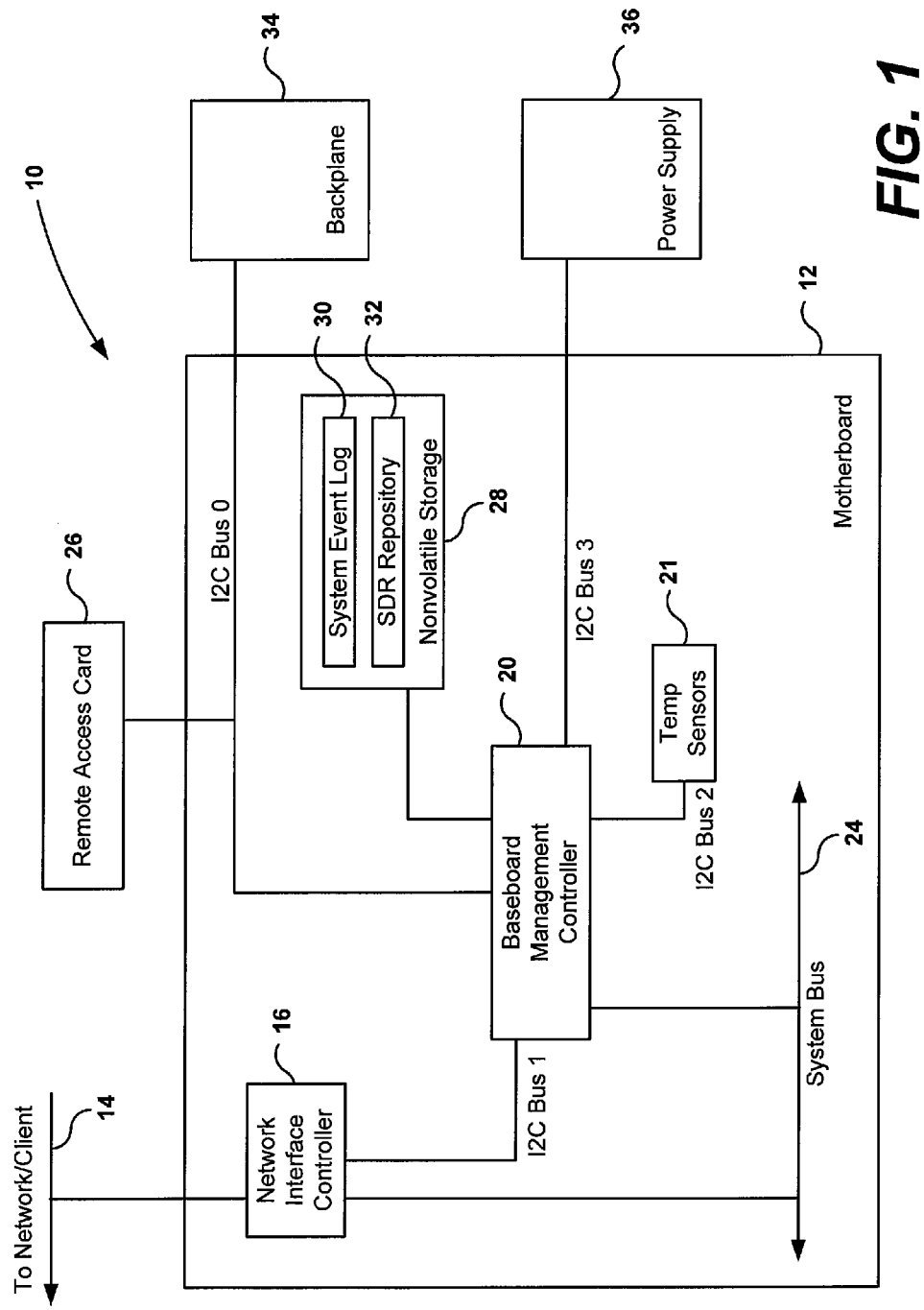
FIG. 1 is a block diagram of elements of a hardware architecture of an information handling system.

The system and method disclosed herein concerns a technique for generating a set of possible system event records that can be logged to a system event log during the operation of a computer system that uses a management interface, such as the Intelligent Platform Management Interface (IPMI) management interface. Shown in FIG. 1 are elements of a hardware architecture of an information handling system, such as a server computer, which is indicated generally at 10

A motherboard 12 includes a baseboard management controller 20 and a network interface controller 16. The network interface controller 16 and the baseboard management controller 20 are each coupled to a system bus 24. Network interface controller 16 serves as an interface between the server computer 10 and an external network or client 14. Baseboard management controller 20 is also coupled to a remote access card 26, which may not reside on motherboard 12. Nonvolatile storage 28 is also coupled to baseboard management controller 20 and resides on motherboard 12. Also coupled to baseboard management controller 20 is temperature sensor 21, which may reside on the motherboard or another board of the system, such as a control panel board. Temperature sensor 21 may comprise sensors for monitoring the temperature of the baseboard management controller or the interior of the server computer. Nonvolatile storage 28 includes a system event log 30 and a sensor data record (SDR) repository 32. Nonvolatile storage 28 is coupled to baseboard management controller 20.

In server computer 10, buses, such as $I^2C$ buses, are coupled between the baseboard management controller and some of the hardware elements of the server system. An $I^2C$ bus, labeled as $I^2C$ Bus 0, is coupled between the backplane 34, remote access card 26, and baseboard management controller 20. A second $I^2C$ bus, labeled $I^2C$ bus 1, is coupled between the baseboard management controller 20 and network interface controller 16. Another $I^2C$ bus, labeled in FIG. 1 as $I^2C$ bus 2 is coupled between baseboard management controller 20 and temperature sensors 21. An $I^2C$ bus, labeled as $I^2C$ bus 3, is coupled between the power supply 36 and the baseboard management controller 20.

Nonvolatile storage 28 includes a SDR repository 28 and a system event log 30. SDR repository 28 is a centralized, non-volatile storage location within the server computer. The SDR repository is managed by and can be accessed by the baseboard management controller. Stored in SDR repository are sensor data records, which comprise information and specifications for each sensor in the server computer. The SDR repository provides the server management software of the computer system with a sensor data record that describes the number, type, and configuration of each sensor of the server system. As an example, in the case of a temperature sensor, the SDR entry for the temperature sensor may include the parameters of the temperature sensor and any threshold operating values for the temperature sensor. Similarly, in the case of a bus sensor, the SDR entry would specify the error conditions of the bus that are monitored by the baseboard management controller. These error conditions could include arbitration errors, no stop conditions, lines stuck low, and the recovery policy of the bus. The format of a sensor data record includes an identification of the type of sensor data record. A Type 1 sensor data record is a full sensor record that can be used by a sensor that includes analog or discrete states. A Type 2 sensor data record is a compact sensor record format that is associated with threshold-based sensors that are operable to monitor a threshold comparison status.

System event log 30 is a nonvolatile storage area that is a log of events that have been recognized by the server management software of the server system. As events occur, the server management software records those events as part of an event record in the system event log 30. An entry in the system event log will include, at a minimum, an identification of the sensor and the event experienced by the sensor.

One example of server management software is IPMI software. The IPMI protocol defines a set of established interfaces for the monitoring and reporting the status of components of a server computer. IPMI software is server management software that executes on the baseboard management controller. IPMI software employs the intelligence of the various hardware devices to present a common, standardized interface for monitoring and reporting on the status of the hardware devices within the server system. The IPMI protocol was established, in part, by Dell Inc. of Round Rock, Tex.; Hewlett-Packard Company of Palo Alto, Calif.; Intel Corporation of Santa Clara, Calif.; and NEC Corporation of Tokyo, Japan. The specification for the IPMI protocol can be found on the Intel web site at http://www.intel.com/design/servers/ipmi.

The IPMI specification provides that event record in the system event log is a 16 byte record. Entries in the system event log can be monitored by a system administrator to manage the operation of the system. A system administrator may monitor entries in the system event log through a Simple Network Management Protocol (SNMP) Alert Standard Format (ASF) platform event trap. Each record that is generated and saved to the system event log will be associated with an IPMI sensor of the computer system. One example of a sensor is a temperature sensor, which might measure the temperature of the baseboard management controller of the interior temperature of the computer system. Another example of a sensor is a power supply sensor, which monitors the status of the various power supplies of the computer system. Each sensor will be associated with a 16-byte sensor data record. The content of the sensor data record will include information concerning the sensor and the event identified by the sensor.

Figure 2:
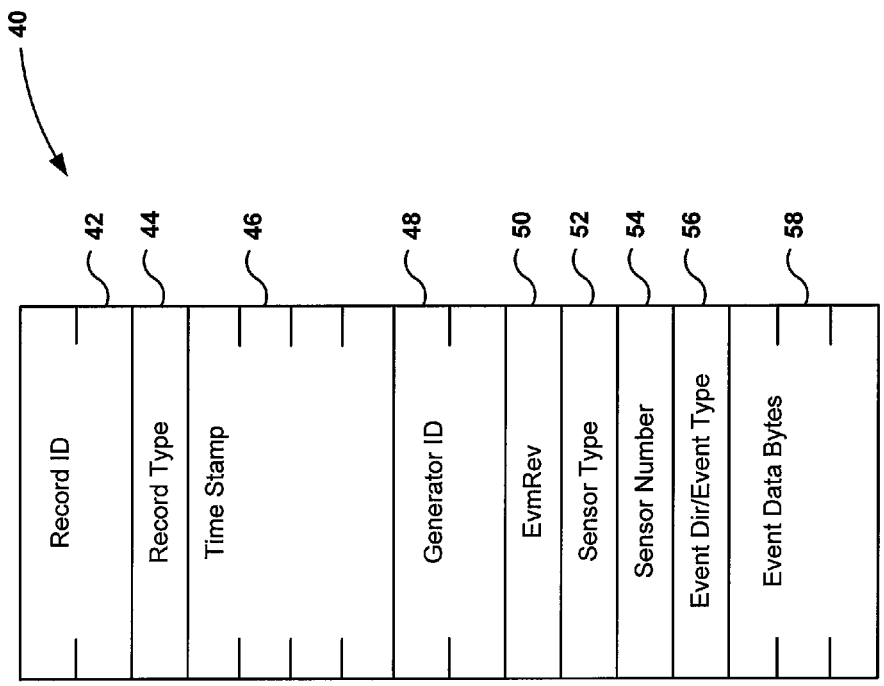
FIG. 2 is a diagram of the format of an SEL event record.

Shown in FIG. 2 is an example of the format of the 16-byte system event log (SEL) event record 40. Record 40 is written to the system event log. Record 40 includes a two-byte Record ID field 42. The content of the Record ID field may be a sequential number reflecting the order in which the records are written to the system event log. Record type 44 is a one byte record that identifies whether record 40 has a standard format or another format defined by the user or manufacturer of the computer system. Time stamp 46 is the time when the event was logged to the system event log. Time stamp 46 is automatically generated. Generator ID field 48 is a two-byte field. The first byte identifies the owner ID of the sensor associated with the event, and the second byte identifies the channel over which the notification of the event was received. The next entry if event record 40 is EvmRev 50, which is also known as the event message format field. This field identifies event message format version. The value of this field changes with each revision to the IPMI specification. Field 52 is the sensor type field. This field includes the sensor type code for the sensor that generated the event. As an example, the sensor type code may identify the sensor as a voltage, current, or temperature sensor, of any of several other sensor types.

The next field in event record 40 is sensor number 54. This field identifies the number of the sensor that generated the event. The next field in event record 40 is the Event Dir/Event Type field. This field is a one byte field. The first bit of the field specifies whether the event is an asserted event or a deasserted event. The other seven bits of the field are an event type field that is populated with a code that identifies the type of trigger for the event and the class of the event. The types of event triggers include the crossing of thresholds or the establishment of a state, for example. The classes of events include discrete event, threshold events, and OEM, or manufacturer or user defined events. The last field in event record 40 is the event data bytes field 58. The first nibble of the first byte of field 58 identifies whether OEM (manufacturer or user specific) data is included in the last two bytes of the field. The second nibble of the first byte includes sensor-specific data that is specific to each type of sensor. In some instances, the last two bytes of the field will not include data.

Figure 3:
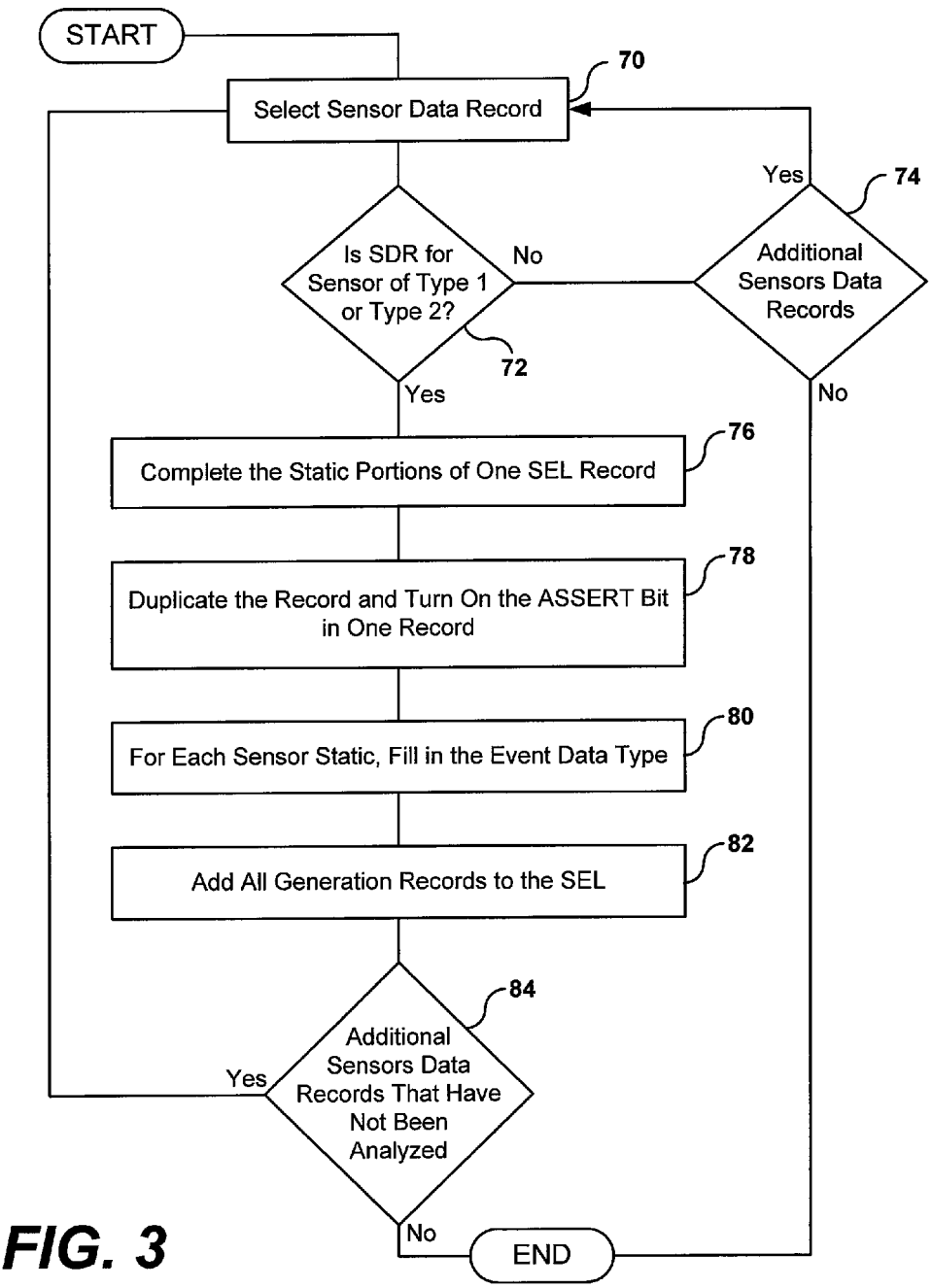
FIG. 3 is a flow diagram of a method for generating a set of possible event records that can be recorded in a system event log.

Shown in FIG. 3 is a flow diagram of a method for generating the set of possible event records that can be recorded in a system event log. At step 70, a sensor data record is selected from the SDR repository. At step 72, the record is reviewed to determine if the sensor data record is a Type 1 (discrete) or a Type 2 (threshold only) sensor data record. If the sensor data record is not a Type 1 or a Type 2 sensor data record, the method determines at step 74 is additional sensor data records exist in the SDR repository. If additional sensor data records do exist in the SDR repository, the next sensor data record is selected at step 70. If additional sensor data records do not exist in the SDR repository, the process ends. Because each sensor data record is associated with a sensor, the process of identifying possible event records can end once all sensor data records have been processed. In the SDR repository there will be records that describe some passive sensors, and there will be OEM data associated with those events that are specific to the platform. These kind of events can be generated by using a configuration file that includes an association of the sensor type to a set of events. During the process of parsing sensor data records, if a passive sensor is identified, a match in the configuration file to generate those OEM-specific events.

If the sensor data record is a Type 1 or Type 2 sensor data record, the static portions of an event record for the sensor associated with the sensor data record are completed at step 76. The event record is then duplicated at step 78 and the ASSERT bit is turned on in one of the duplicate records. Following step 78, there are two event records, one with the ASSERT bit turned on and one with the ASSERT bit turned off. At step 80, depending on the sensor type (field 52 of FIG. 2) and the type of trigger for the event and the class of the event (the lower seven bits of the Event Dir/Event Type field 56 of FIG. 2), the event data bytes (field 58 of FIG. 2) are populated for each of the two event records. Thus, depending on the type of sensor, such as a voltage, current, or temperature sensor, for example, and depending on whether the event is triggered to a discrete event or a threshold event, the information that is specific to the sensor and the event is recorded in the event data bytes for the event record, for an event record is which the ASSERT bit is on and an event record in which the ASSERT bit is off. Step 80 is performed for each possible state of the sensor, which is defined as the combination of sensor type and event trigger. Thus, following step 80, there are 2*n generated event records, where n is the number of states (combination of sensor types and event triggers) associated with the sensor and the multiplier two reflects that each event record is recorded with ASSERT bit on and the ASSERT bit off.

At step 82, each generated event record is saved to the system event log or some other suitable storage location for later analysis of the generated set of event records. At step 84, it is determined if there are additional sensor data records that have not been analyzed. If there are additional sensor data records that have not been analyzed, the method continues at step 70. If there are no additional sensor data records to be analyzed, the method ends. The end result of this method is a generated collection of each possible event record for the IPMI-compliant computer system.

Once all of the generated event records are known, the set of possible event records can be analyzed by humans on another computer program. Having a knowledge of each possible event record is valuable, as it provides a user or administrator with the opportunity to plan for, manage, validate, and test each possible event that is generated and consumed within the computer. In addition, because each possible event is known, a set of translations could be constructed in which an IPMI event is translated for use and handling by another operating system or computer system.

It should be recognized that the system and method disclosed herein is not limited in its application to the IPMI specification. Rather, the system and method disclosed herein may be employed with any system management software to generate a comprehensive set of data records corresponding to each monitored event of the computer system. Although the present disclosure has been described in detail, it should be understood that various changes, substitutions, and alterations can be made hereto without departing from the spirit and the scope of the invention as defined by the appended claims.

What is claimed is:

1. A method for generating a set of all possible event records associated with an event recognized by a sensor in a computer system, wherein each event record includes a predetermined format, comprising:
providing a sensor, wherein one or more events are associated with the sensor in a sensor data record corresponding to the sensor, and wherein an event trigger is associated with each of the one or more events;
providing an event record for each of the one or more events prior to an occurrence of the event trigger associated with each of the one or more events, wherein providing an event record comprises the steps of:
completing static portions of the event record, wherein the static portions of the event record include an identification of the sensor corresponding to the event;
duplicating the event record;
completing an event data portion of the duplicate of the event record and the event record, wherein the event data portions are completed independent from accomplishment of the event trigger; and
completing an assert portion of at least one of the event record and the duplicate of the event record; and
collecting the completed duplicate of the event record and the event record for to each of the one or more events.

2. The method for generating a set of all possible event records associated with an event recognized by a sensor in a computer system of claim 1, wherein the computer system is an IPMI-compliant computer system.

3. The method for generating a set of all possible event records associated with an event recognized by a sensor in a computer system of claim 2, wherein the event trigger is associated with either a discrete event trigger or a threshold event trigger.

4. The method for generating a set of all possible event records associated with an event recognized by a sensor in a computer system of claim 3, wherein the step of completing an event data portion of the duplicate of the event record and the event record comprises populating the duplicate of the event record and the event record with data that reflects a type of sensor associated with the event and whether the event trigger is associated with either a discrete event trigger or a threshold event trigger.

5. The method for generating a set of all possible event records associated with an event recognized by a sensor in a computer system of claim 2, wherein the step of collecting the completed duplicate of the event record and the event record comprises storing the completed duplicate of the event record and the event record in a system event log of the computer system.

6. A method for generating an event record of each possible event that can be recorded in an event log of a computer system, comprising:
- identifying in a sensor data repository a sensor data record corresponding to each respective sensor of the computer system, wherein one or more events are associated with each sensor;
- for each sensor of the computer system, prior to an occurrence of an event trigger corresponding to the one or more events, providing an event record for the sensor and completing the steps of:
  - populating at least some static portions of the event record, wherein the at least some static portions of the event record include an identification of the sensor corresponding to the event,
  - duplicating the event record,
  - completing a version of the event record for each state of the sensor, wherein each state of the sensor is defined by a type of the sensor and a trigger event for the sensor, wherein the version of the event record for each state of the sensor is completed independent from accomplishment of the corresponding trigger event;
- collecting completed versions of the event records for all of the sensors of the computer system.

7. The method for generating an event record of each possible event that can be recorded in an event log of a computer system of claim 6, wherein the computer system is an IPMI-compliant computer system.

8. The method for generating an event record of each possible event that can be recorded in an event log of a computer system of claim 7, wherein the event log is a system event log of an IPMI-compliant computer system.

9. The method for generating an event record of each possible event that can be recorded in an event log of a computer system of claim 8, wherein the step of populating at least some static portions of the event record comprises populating those portions of the event record that do not depend on the state of the sensor.

10. The method for generating an event record of each possible event that can be recorded in an event log of a computer system of claim 8, wherein the step of collecting completed versions of the events records for all of the sensors comprises collecting the completed versions of the event records in the system event log of the computer system.

11. The method for generating an event record of each possible event that can be recorded in an event log of a computer system of claim 8, wherein the trigger event for the sensor is associated with a discrete trigger event or a threshold trigger event.

12. A method for generating a set of possible system event log events in an IPMI-compliant computer system, comprising:
- for each sensor, prior to an occurrence of an event trigger corresponding to one or more events associated with the sensor in a sensor data record, providing an event record for the sensor and completing the steps of:
  - populating at least some static portions of the event record, wherein the static portions of the event record include an identification of the sensor corresponding to the event;
  - duplicating the event record;
  - completing a version of the event record for each state of the sensor, wherein each state of the sensor is defined by a type of the sensor and a trigger event for the sensor, wherein the version of the event record for each state of the sensor is completed independent from the accomplishment of the corresponding trigger event;
- collecting completed versions of the event records for all of the sensors of the computer system.

13. The method for generating a set of possible system event log events in an IPMI-compliant computer system of claim 12, wherein the step of identifying each sensor of the computer system comprises identifying each sensor data record in a sensor data repository of the computer system.

14. The method for generating a set of possible system event log events in an IPMI-compliant computer system of claim 12, wherein the step of populating at least some static portions of the event record comprises populating those portions of the event record that do not depend on the state of the sensor.

15. The method for generating a set of possible system event log events in an IPMI-compliant computer system of claim 12, wherein the step of collecting completed versions of the events records for all of the sensors comprises collecting the completed versions of the event records in the system event log of the computer system.

16. The method for generating a set of possible system event log events in an IPMI-compliant computer system of claim 12, wherein the trigger event for the sensor is associated with a discrete trigger event or a threshold trigger event.

* * * * *